(12) United States Patent
Galloway

(10) Patent No.: US 11,584,336 B2
(45) Date of Patent: Feb. 21, 2023

(54) SEAT BELT ACCESSORY AND METHOD OF USE

(71) Applicant: Richard H. Galloway, Des Moines, IA (US)

(72) Inventor: Richard H. Galloway, Des Moines, IA (US)

( * ) Notice: Subject to any disclaimer, the term of this patent is extended or adjusted under 35 U.S.C. 154(b) by 0 days.

(21) Appl. No.: 17/514,764

(22) Filed: Oct. 29, 2021

(65) Prior Publication Data

US 2022/0134994 A1     May 5, 2022

Related U.S. Application Data

(60) Provisional application No. 63/108,133, filed on Oct. 30, 2020.

(51) Int. Cl.
    *B60R 22/30*     (2006.01)
(52) U.S. Cl.
    CPC ..................... *B60R 22/30* (2013.01)
(58) Field of Classification Search
    CPC ............ B60R 22/19; B60R 2022/1818; B60R 2022/286; B60R 22/30
    See application file for complete search history.

(56) References Cited

U.S. PATENT DOCUMENTS

| | | | | |
|---|---|---|---|---|
| 4,810,036 A * | 3/1989 | Buser | .............. | B60R 22/19 297/483 |
| 4,893,874 A * | 1/1990 | Childress | .............. | B60R 22/30 297/483 |
| 5,653,003 A * | 8/1997 | Freeman | .............. | B60R 22/19 24/298 |
| 5,902,016 A * | 5/1999 | Moran | .............. | B60R 22/105 297/484 |
| 5,971,489 A * | 10/1999 | Smithson | .............. | B60R 22/3413 188/374 |
| 6,099,078 A * | 8/2000 | Smithson | .............. | F16F 7/127 280/805 |
| 8,146,946 B1 * | 4/2012 | Emond | .............. | B60R 22/30 297/483 |
| 8,608,247 B2 * | 12/2013 | Roman | .............. | B60R 22/023 297/483 |
| 10,131,317 B1 * | 11/2018 | Harrington | .............. | B60N 2/265 |

(Continued)

FOREIGN PATENT DOCUMENTS

| | | | | |
|---|---|---|---|---|
| EP | 1607285 A1 * | 12/2005 | .............. | B60R 22/19 |
| GB | 2265814 A * | 10/1993 | .............. | B60R 22/1958 |
| KR | 20200065867 A * | 6/2020 | .............. | B60R 22/26 |

*Primary Examiner* — Paul N Dickson
*Assistant Examiner* — Maxwell L Meshaka
(74) *Attorney, Agent, or Firm* — David M. Breiner; BrownWinick Law Firm

(57) ABSTRACT

A seat belt accessory comprising a first and second fastener connected by a connecting member. The fasteners may be of various shapes, sizes, designs, and dimensions. The seat belt assembly can be used to improve the comfort of a passenger riding in a vehicle or any other apparatus requiring seat belt restraints by creating more space between the seat belt and the passenger and eliminating any pinching created by the seat belt. In addition to creating a more comfortable passenger experience, the seat belt accessory allows easier seat belt access to passengers with mobility problems, serves as a reminder for passengers to use their seat belt, and instantly protect passengers upon crash.

16 Claims, 17 Drawing Sheets

(56) References Cited

U.S. PATENT DOCUMENTS

| | | | |
|---|---|---|---|
| 10,189,438 B2* | 1/2019 | DeMaise | B60R 22/30 |
| 10,793,103 B2* | 10/2020 | Kukielka | B60R 22/12 |
| 11,273,791 B1* | 3/2022 | Willm | B60R 22/30 |
| 2002/0145279 A1* | 10/2002 | Murray | B60R 22/105 |
| | | | 280/801.1 |
| 2012/0112516 A1* | 5/2012 | Roman | B60R 22/023 |
| | | | 297/483 |
| 2018/0050657 A1* | 2/2018 | Wang | B60R 22/20 |
| 2018/0326941 A1* | 11/2018 | DeMaise | B60R 22/30 |
| 2019/0001921 A1* | 1/2019 | Wang | A44B 11/10 |
| 2019/0111887 A1* | 4/2019 | Kukielka | B60R 22/024 |
| 2019/0193673 A1* | 6/2019 | Williams | B60R 22/18 |
| 2020/0290557 A1* | 9/2020 | Wang | B60R 22/12 |

* cited by examiner

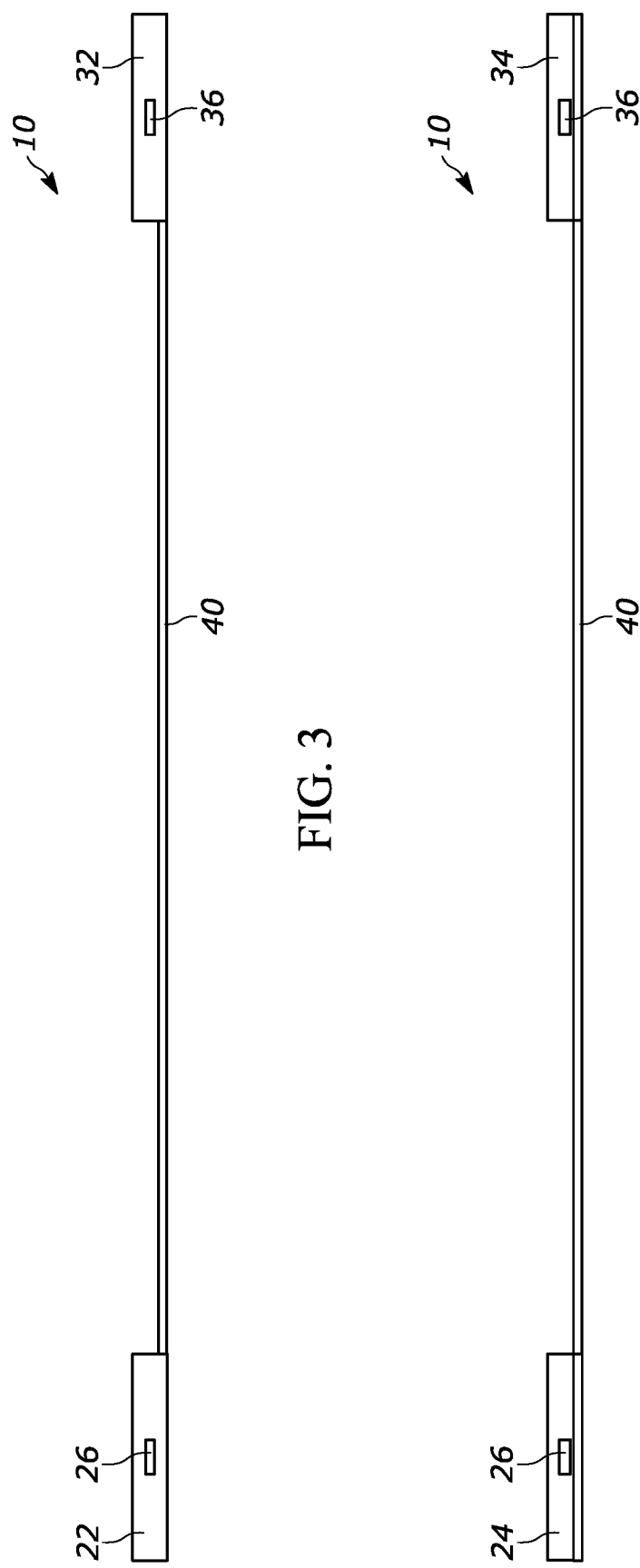

SEAT BELT ACCESSORY AND METHOD OF USE

CROSS REFERENCE TO RELATED APPLICATIONS

This application claims benefit from U.S. Provisional Application No. 63/108,133, which was filed Oct. 30, 2020, the entirety of which is incorporated herein fully by reference.

FIELD OF THE DISCLOSURE

The present disclosure relates generally to a seat belt accessory, and more particularly a seat belt accessory which hangs by the window when not in use to encourage seat belt use when entering the vehicle by providing a more comfortable seat belt fit, a reminder to use a seat belt, and convenient access to a seat belt in many vehicles. Additionally, the present disclosure is able to instantly flatten in the event of a crash.

BACKGROUND OF THE DISCLOSURE

Modern seat belts came into being in 1958 when Swedish engineer Nils Bohlin invented the three-point seatbelt. The three-point seatbelt protects both the upper and lower body by having one portion of the seat belt extend over a person's lap and another portion of the seat belt extend over a person's upper body. Seat belts have been shown to save lives and some studies suggest seat belts cut car crash fatalities in half.

BRIEF SUMMARY OF THE DISCLOSURE

Despite the safety afforded by seat belts, the inventor has found some people still choose not to use their seat belts. One reason for this is some users find seat belts uncomfortable in that they pinch or rub the user in certain places along the upper part of the strap that goes from the lap strap to across the upper shoulder of the user. The seemingly best solution is to attach a spacer, typically using snap fasteners, around the upper strap, permitting the user to slide the spacer up or down on the upper strap to any place that the seat belt is rubbing, pinching, or pressuring the user. As it turns out, this is only a partial solution to the problem, because some rubbing, pinching and other types of discomfort still occurs. Additionally, the presence of the seat belt when not in use is frequently forgotten. Because the location of the seat belt, when not in use, is typically behind the user, it is not only difficult to see but easy to forget. Moreover, for passengers with mobility issues, reaching for a seat belt can sometimes be a challenge to reach and secure the seat belt. In view of this, Applicant invented an attachment to a seatbelt making the seatbelt more comfortable to wear, easier to see, and easier to use for all people with or without mobility issues. Such an attachment has the potential to save lives. The attachment has an overwhelming purpose by showing, demonstrating, and convincing people to use their seat belt and be comfortable in saving their own lives and convincing others to do the same.

Disclosed is an example seat belt accessory comprising a first fastener having an upper component, a lower component, and locking features. The upper component and lower component of the first fastener may each have securing features. The example seat belt accessory also comprises a second fastener. The second fastener may also have an upper component, a lower component, and locking features. The upper component and lower component of the second fastener may have securing features similar to the upper component and lower component of the first fastener. Finally, the example seat belt accessory comprises a connecting member. The connecting member extends between the first fastener and the second fastener. The upper components of the first and second fasteners may be configured to engage the lower components of their respective fastener by way of the locking features.

BRIEF DESCRIPTION OF THE DRAWINGS

The above needs are at least partially met through provision of the apparatus described in the following detailed description, particularly when studied in conjunction with the drawings, wherein:

FIG. 3 is a front view of an example of the seat belt accessory of FIG. 1, wherein the locking features of the first and second fasteners are shown as snap closures on the lower component, and the connecting member connects the first and second fasteners by attaching to the lower component.

FIG. 4 is a back view of an example of the seat belt accessory of FIG. 1 wherein the locking features of the first and second fasteners are shown as holes on the upper component to accommodate the snap closures, and the connecting member which attaches the first and second fasteners by way of the lower components.

FIG. 12 shows the seat belt accessory near a middle of the body the seat belt accessory may be moved up or down, for example, towards or over the shoulder.

FIG. 18 further shows secondary locking features which may prevent primary locking features from decoupling.

DETAILED DESCRIPTION AND BEST MODE OF IMPLEMENTATION

In the following detailed description of the embodiments, reference is made to the accompanying drawings which form a part hereof, and in which is shown by way of illustration specific preferred embodiments in which the disclosure may be practiced. These embodiments are described in sufficient detail to enable those skilled in the art to practice the disclosure, and it is to be understood that other embodiments may be utilized, and that mechanical, procedural, and other changes may be made without departing from the spirit and scope of the present disclosures; which is a sure fired way to save lives. The following detailed description is, therefore, not to be taken in a limiting sense, and the scope of the present disclosure is defined only by the appended claims, along with the full scope of equivalents to which such claims are entitled.

As used herein, the terminology such as vertical, horizontal, top, bottom, front, back, end and sides are referenced according to the views presented. It should be understood, however, that the terms are used only for purposes of description and are not intended to be used as limitations. Accordingly, orientation of an object or a combination of objects may change without departing from the scope of the disclosure.

Seat Belt Accessory 10

Figure 8:
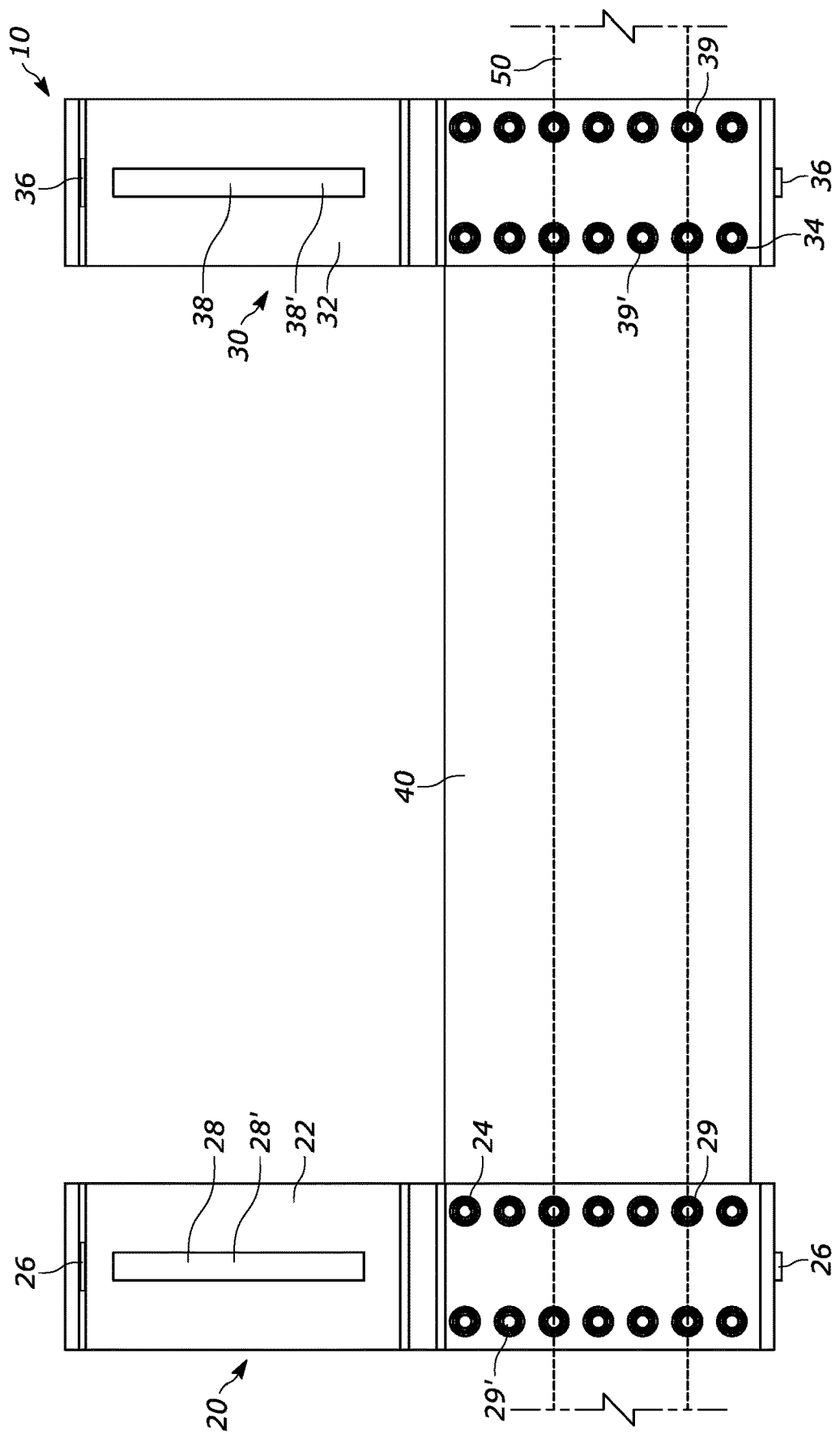
FIG. 8 is a top view of an example of the seat belt accessory of FIG. 1 wherein a seat belt is placed along the lower component and the first and second fasteners are open.
Figure 9:
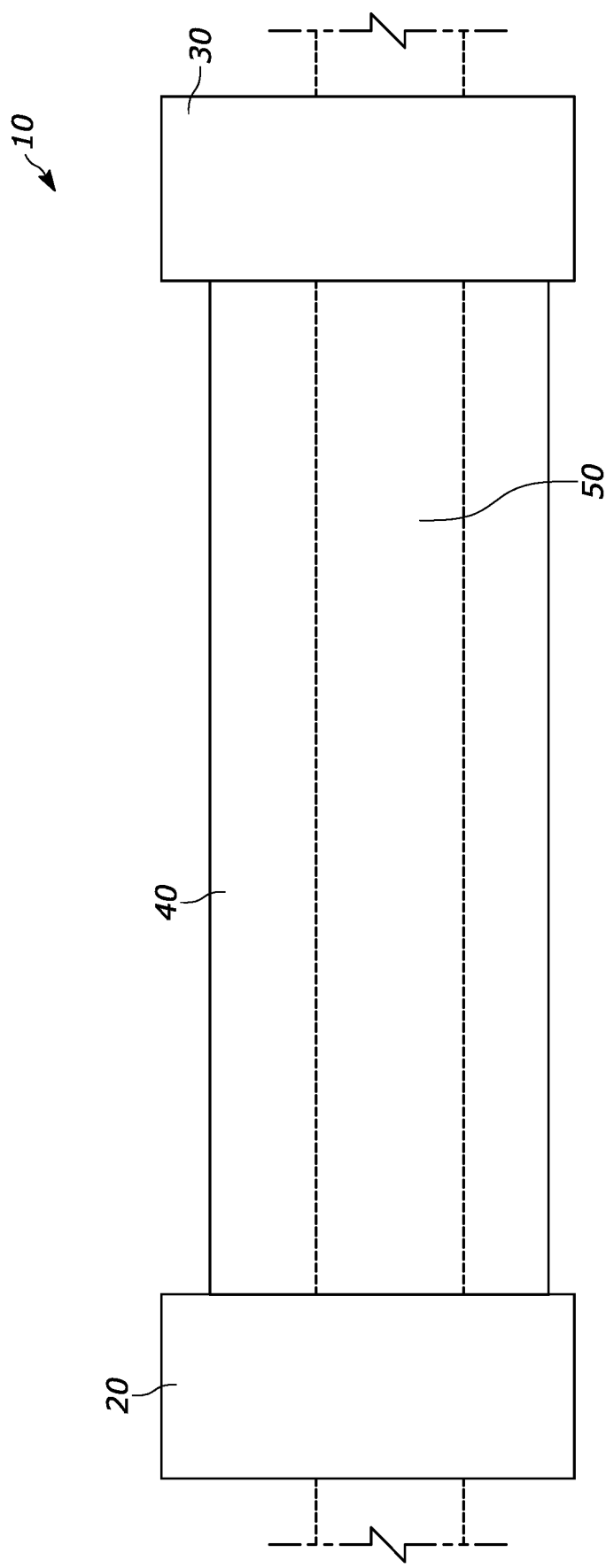
FIG. 9 is a top view of an example of the seat belt accessory of FIG. 1 wherein the seat belt accessory is in use on a seat belt, the upper components are engaging the lower components and the first and second fasteners are closed.
Figure 10:
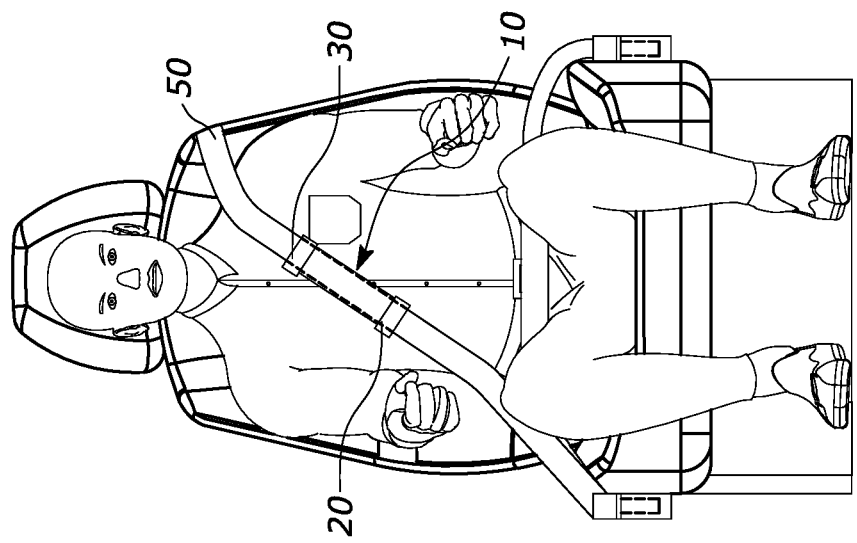
FIG. 10 is a front view of an example of the seat belt accessory of FIG. 1 in use on a seat belt wherein the seat belt accessory is located between the seat belt and a passenger.
Figure 11:
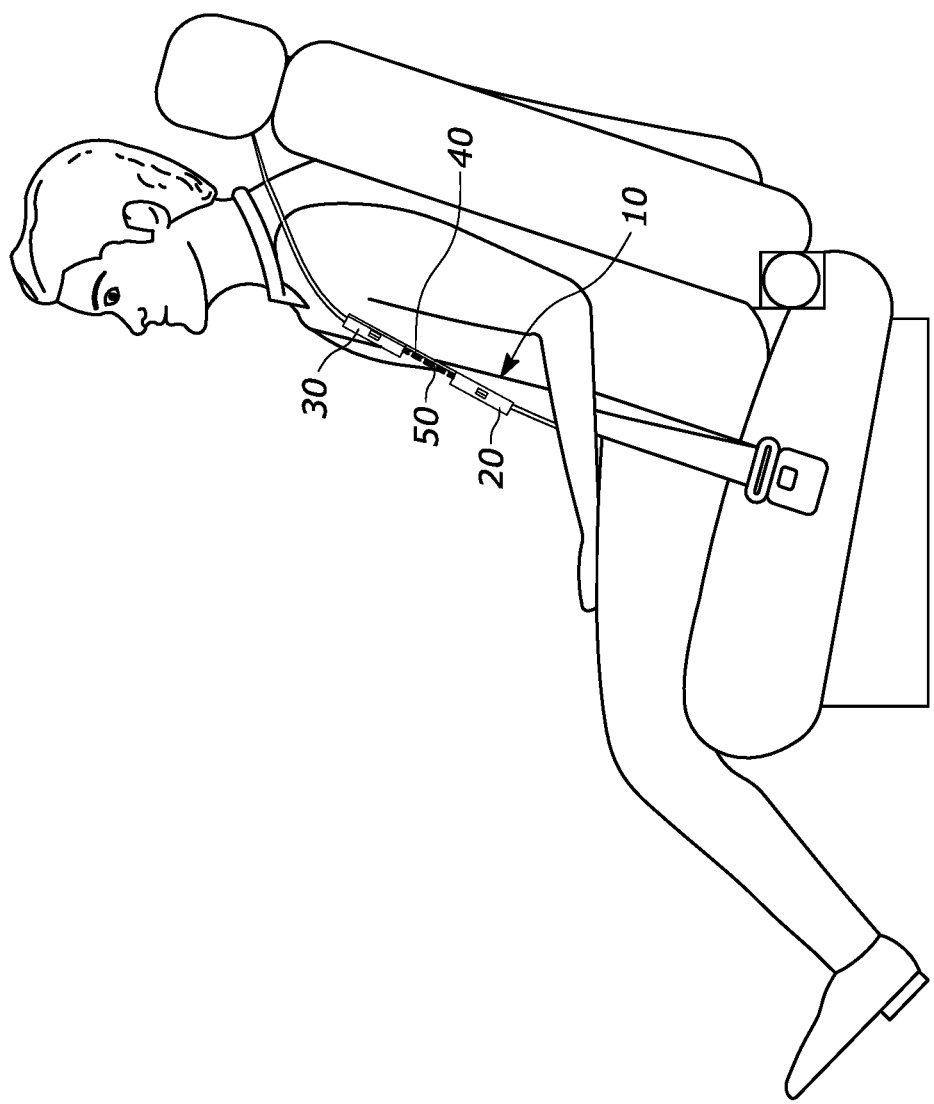
FIG. 11 is a side view of an example of the seat belt accessory of FIG. 1 in use on a seat belt wherein the seat belt accessory is located between the seat belt and a passenger and the connecting member is straightened.
Figure 12:
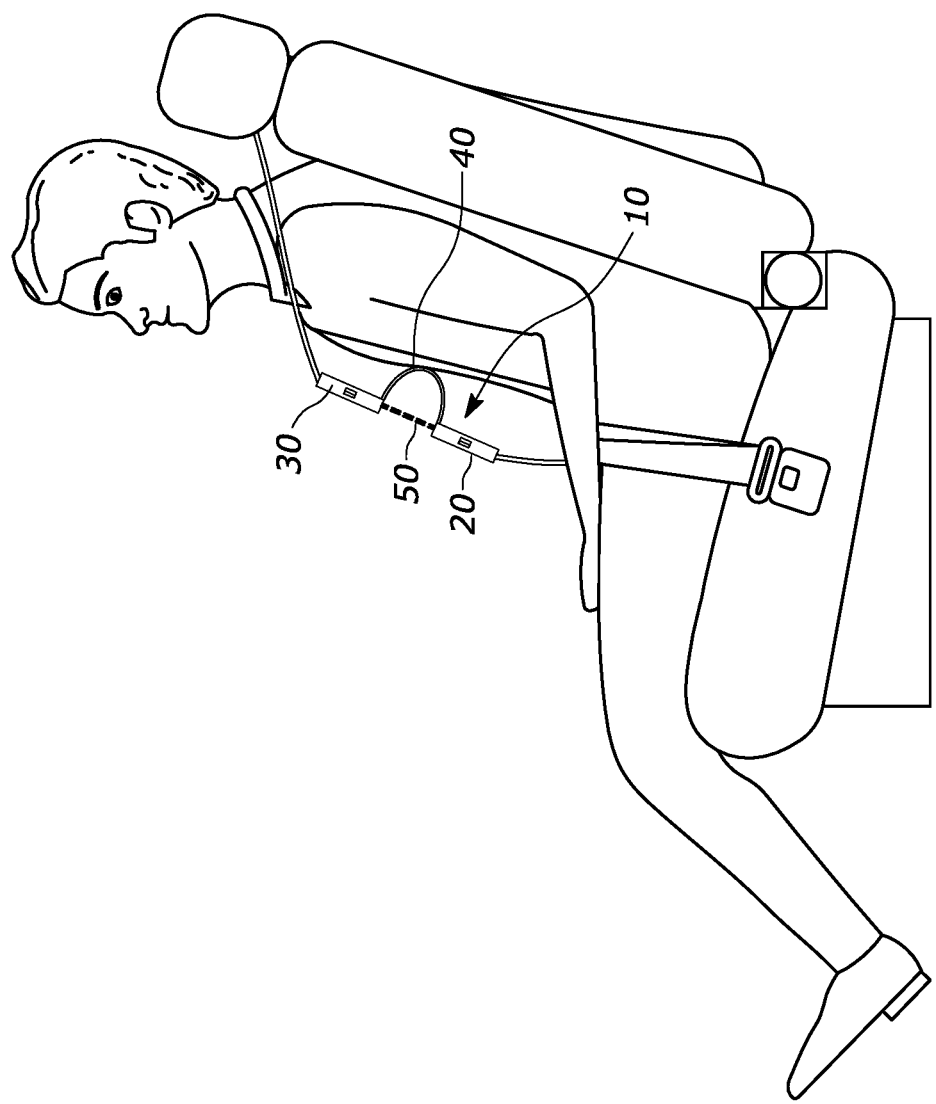
FIG. 12 is a side view of an example of the seat belt accessory of FIG. 1 in use on a seat belt wherein the seat belt accessory is located between the seat belt and a passenger and the connecting member is bent. Although

As stated above, a seat belt accessory 10 may include a first fastener 20, a second fastener 30, and a connecting member 40. The first fastener 20 and second fastener 30 may be of any shape and may be constructed out of any suitable material. In example embodiments, the seat belt accessory 10 can be attached to a seat belt 50 (see FIG. 8) in a vehicle. Because the fasteners 20/30 utilize frictional forces to stay in place, the seat belt accessory 10 can be adjusted and moved at any position along the length of the seat belt 50 without removing the seat belt accessory 10 or the fasteners 20/30 from the seat belt 50. The seat belt accessory 10 is preferably constructed of a resilient material, for example, a bendable plastic material, of the type that will return, at least substantially, to its original shape after bending. Nonlimiting examples of materials usable for the seat belt accessory include polyethylene, poly propylene, or nylon.

First and Second Fasteners 20/30

Figure 1:
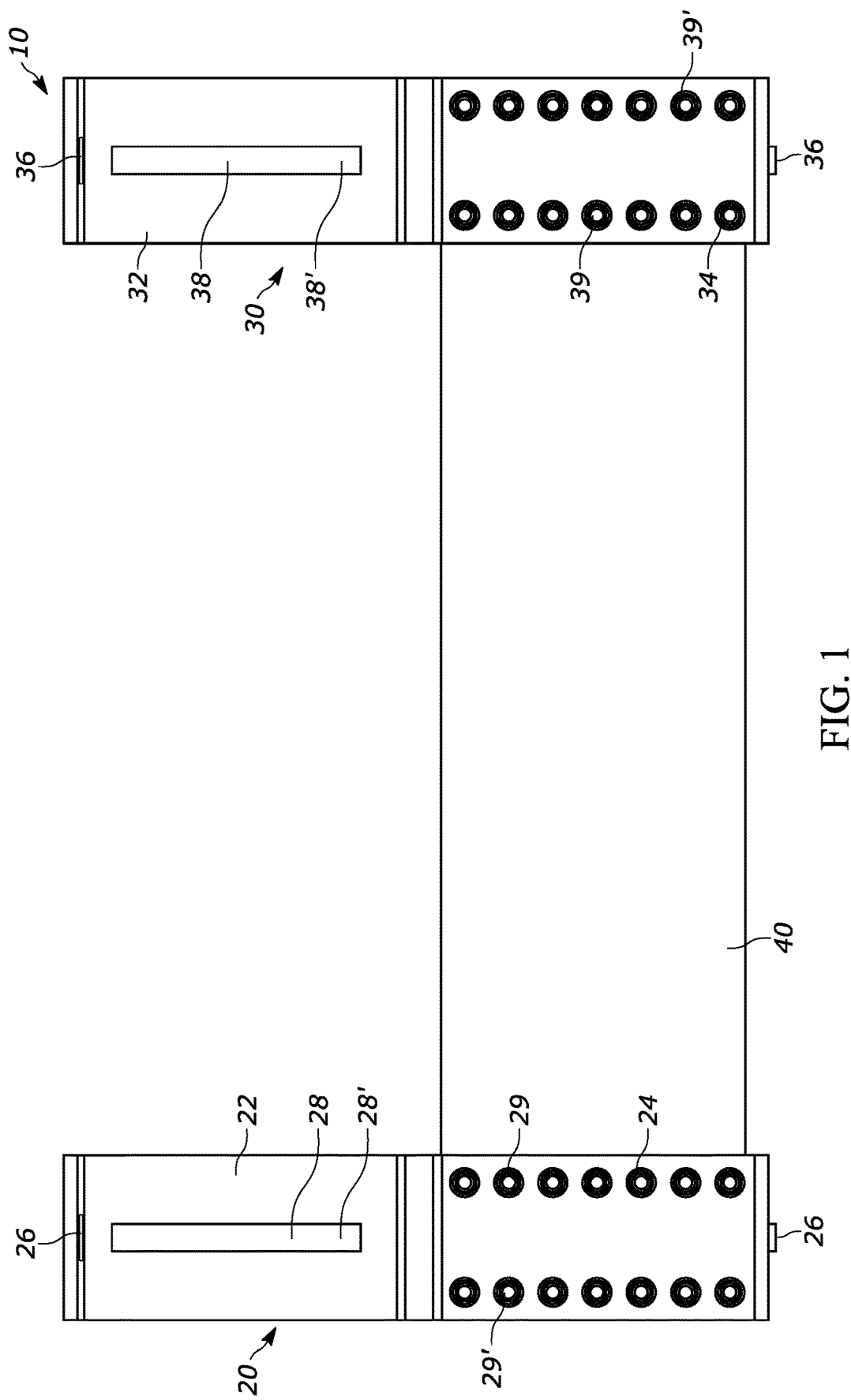
FIG. 1 is a top view of an example of a seat belt accessory with the first and second fasteners open. This view shows the locking features of the fasteners and the securing features of the upper and lower components. The securing features in the example embodiment being a plurality of projections on the lower component and a flange in the upper component. It also shows the connecting member which connects the first fastener to the second fastener.
Figure 2:
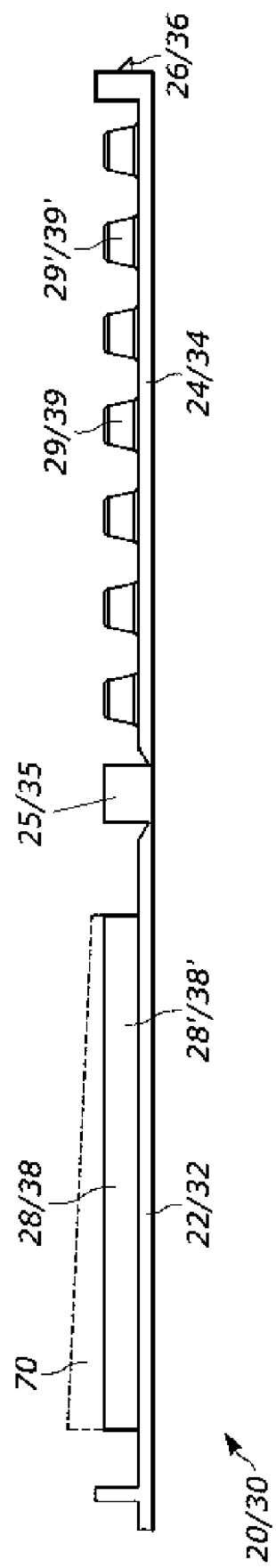
FIG. 2 is a side view of an example of the seat belt accessory, opened, of FIG. 1 wherein the upper component and lower component are connected by a pivot joint and the securing features of the upper component is a flange and the securing features of the lower component are a plurality of projections. It also shows an alternative embodiment of the flange as an angled flange in dashed lines. The locking features of the first and second fasteners are shown as a snap closure.
Figure 5:
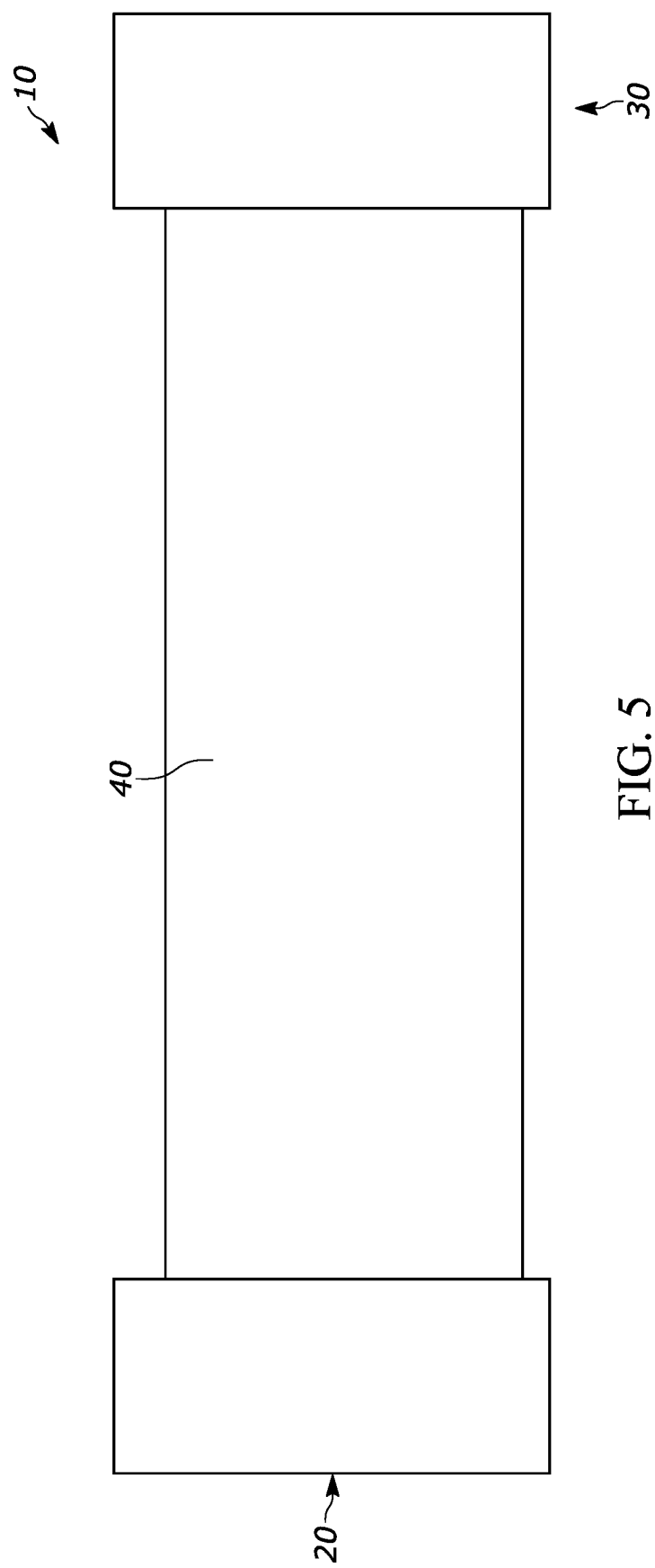
FIG. 5 is a top view of an example of the seat belt accessory of FIG. 1 wherein the first and second fasteners are closed.
Figure 6:
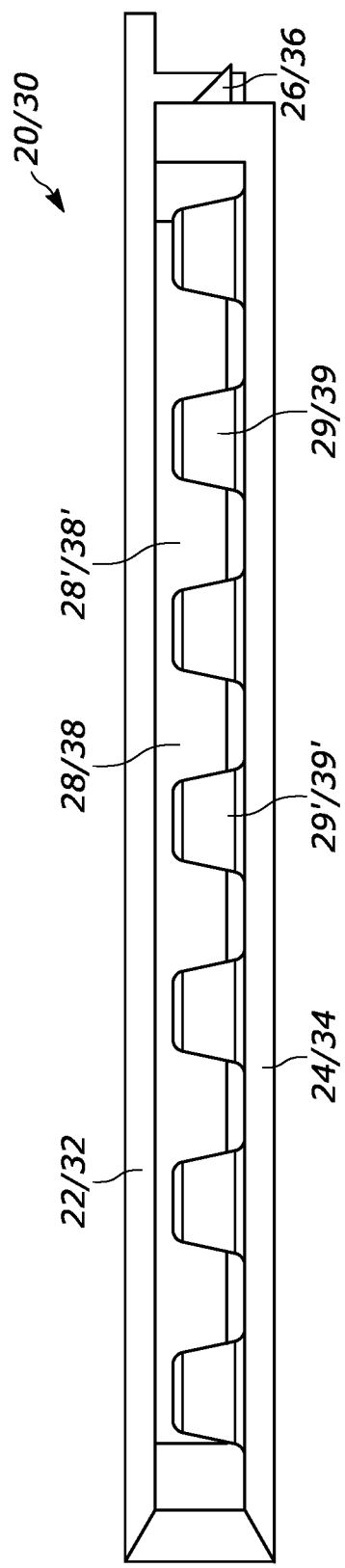
FIG. 6 is a side view of an example of the seat belt accessory of FIG. 1 wherein the securing features of the upper component are configured to fit in between the securing features of the lower component and the locking features of the first and second fasteners are snap closures which comprise a protrusion in the lower component which fits within a hole of the upper component.
Figure 7:
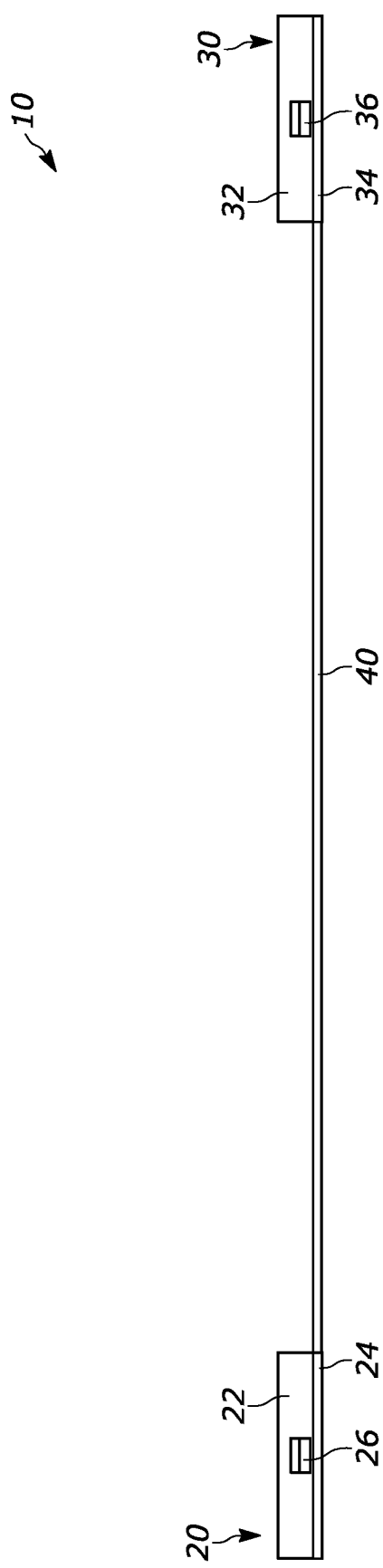
FIG. 7 is a front view of an example of the seat belt accessory of FIG. 1 wherein the locking features of the first and second fasteners are engaged, the locking features in this particular embodiment being snap closures comprising a protrusion on the lower components which fits inside a hole in the upper components.
Figure 13:
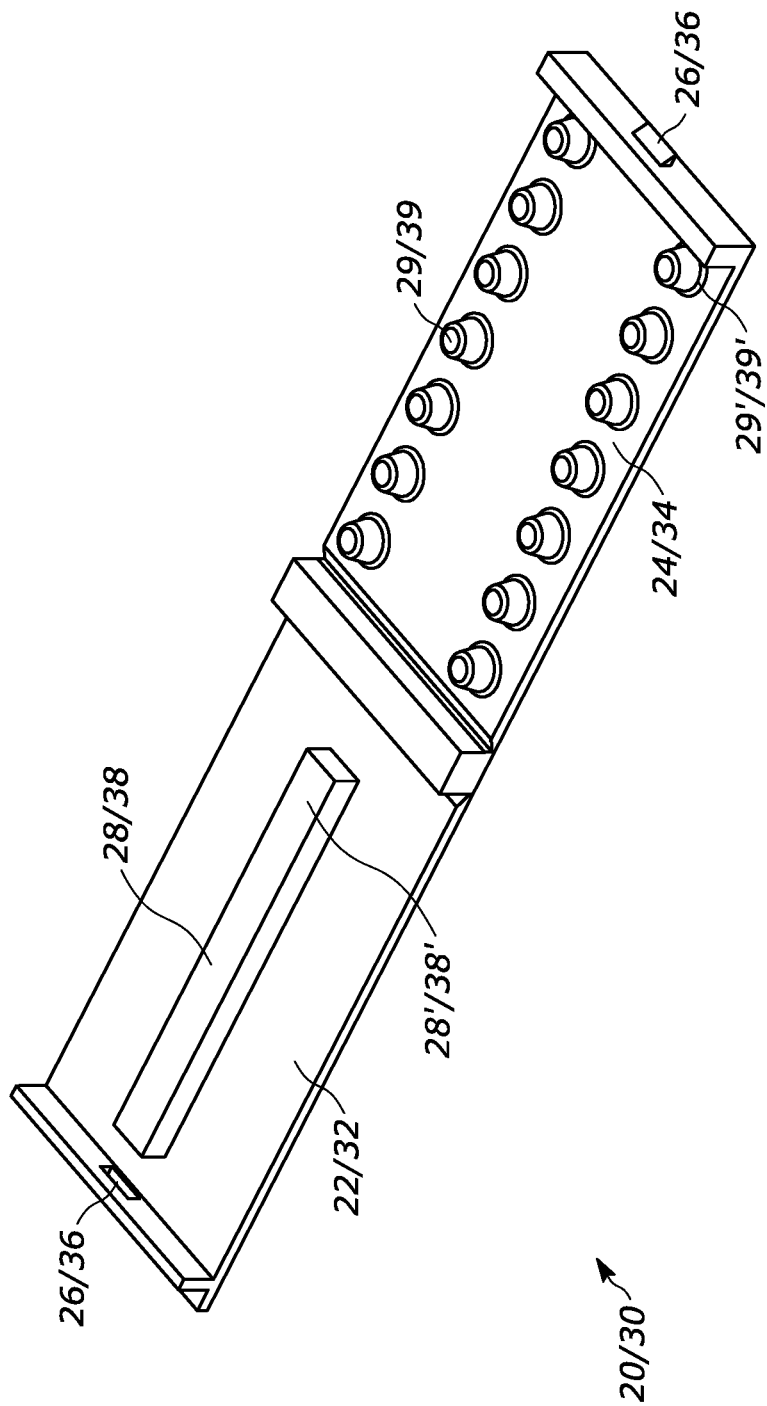
FIG. 13 is a perspective view of an example of a first and second fastener showing the locking features of the first and second fasteners, the securing features of the upper and lower components, and a pivot joint to connect the upper and lower component; wherein the securing features are a plurality of projections on the lower component and a flange on the upper component.
Figure 14:
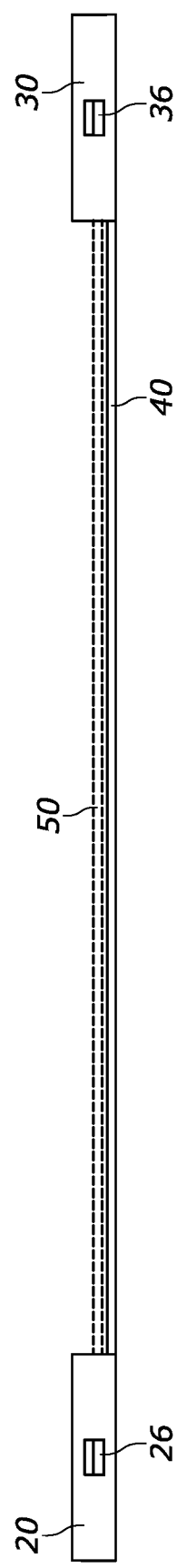
FIG. 14 is a front view of the seat belt accessory of FIG. 1 wherein the seat belt accessory is placed on a seat belt, the first and second fasteners are closed, and the connecting member is straight.
Figure 15:
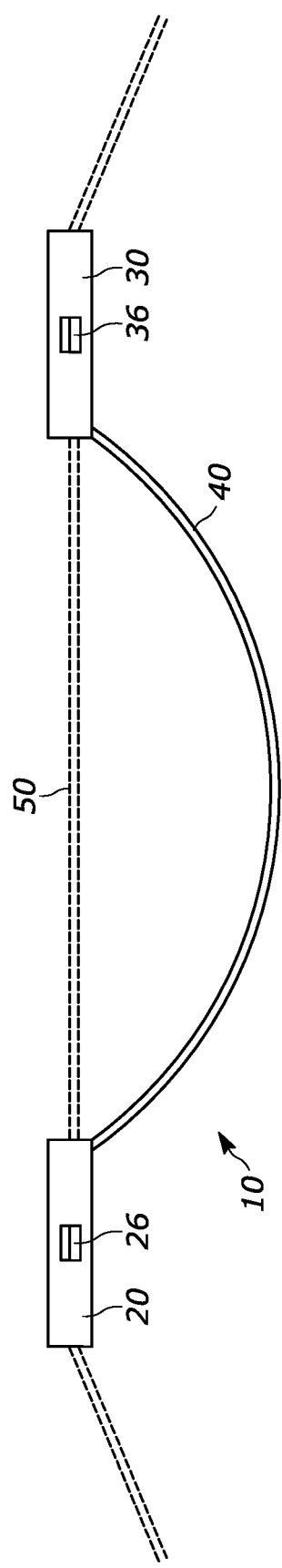
FIG. 15 is a front view of the seat belt accessory of FIG. 1 wherein the seat belt accessory is placed on a seat belt, the first and second fasteners are closed, and the connecting member is bent.
Figure 16:
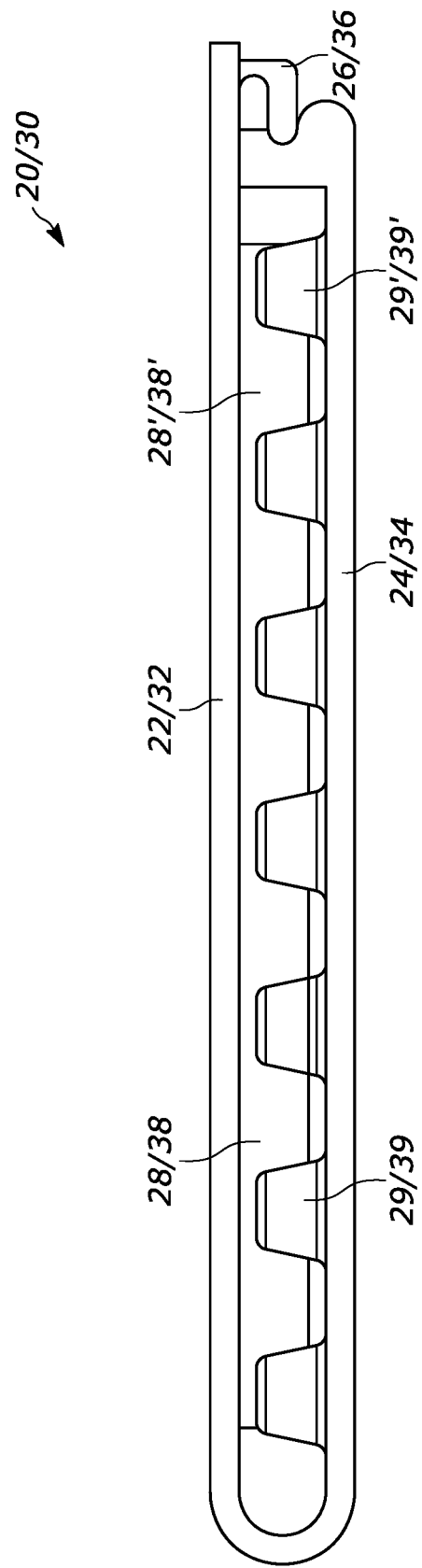
FIG. 16 is a side view of an alternative embodiment of a first or second fastener wherein the locking features are a snap closure comprising one hook located on the upper component of either the first or second fastener and a second complementary hook located on the lower component of either the first or second fastener, the two hooks configured to engage each other and lock the fasteners closed.
Figure 17:
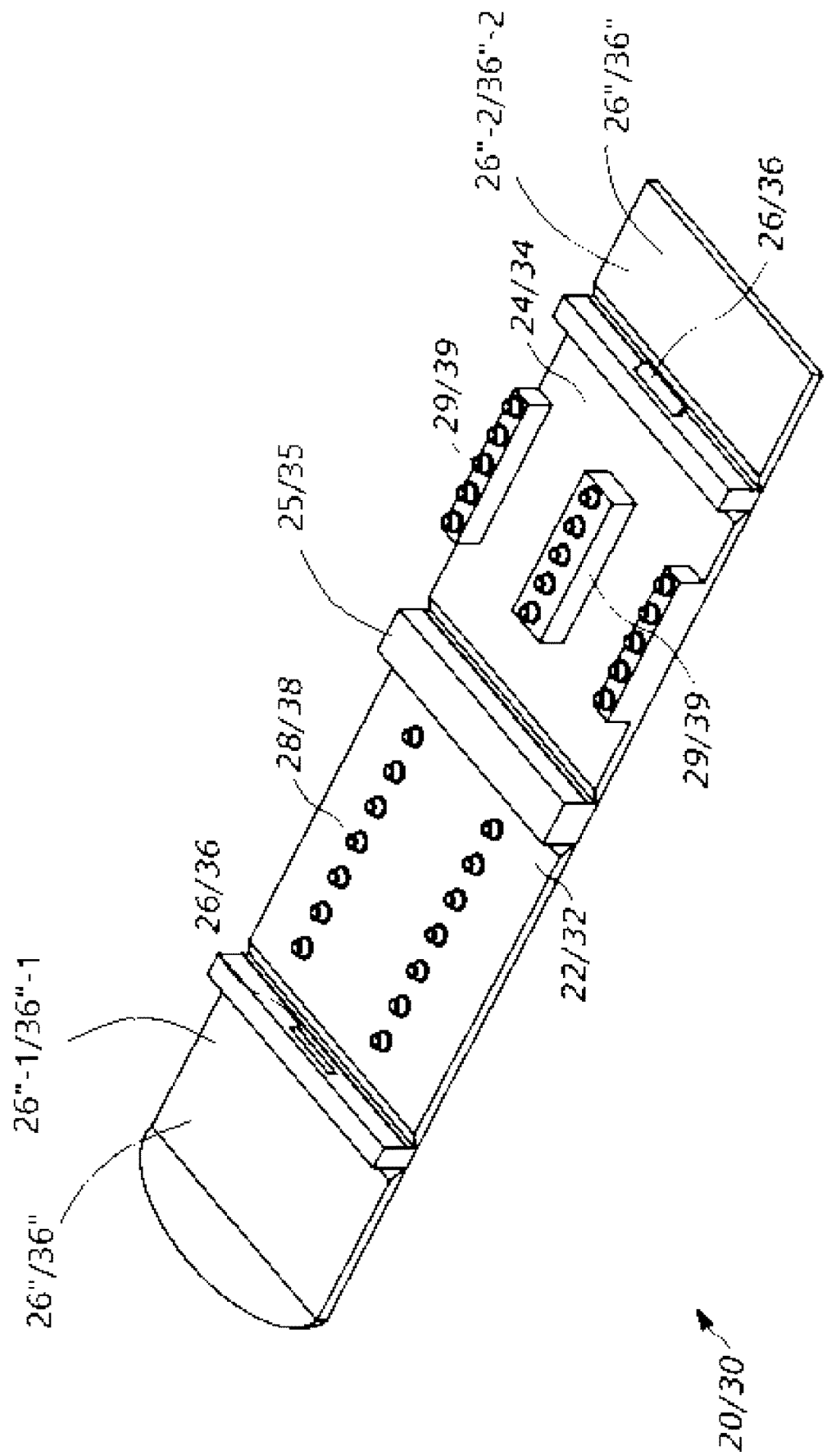
FIG. 17 is an angled view of an alternative embodiment of a first or second fastener wherein the securing features on the upper component are two flanges with a plurality of protrusions on top of the flanges and the securing features on the lower component are one flange with a plurality of protrusions on top of it. The locking features in this nonlimiting embodiment may include snap closures and additional fasteners on both the lower and upper component configured to engage each other and lock the fasteners closed.

As stated above, a seat belt accessory 10 may include a first fastener 20 and a and second fastener 30. In some embodiments, as can be seen in FIG. 1, the fasteners 20/30 may be comprised of two components—an upper component 22/32 and a lower component 24/34—connected at a joint and/or hinge 25/35. In this nonlimiting example embodiment, the joint and or hinge may allow the upper component to rotate on top of the lower component 24/34. The fasteners 20/30, upon closing, may be locked in place by the locking features 26/36. In still other embodiments, there need not be a joint or hinge. The locking features 26/36 may be a snap closure, Velcro, or any other type of locking mechanism capable of ensuring the upper component 22/32 and lower component 24/34 remain in place when in use. In an example embodiment as shown in FIG. 13, the upper component 22/32 and lower component 24/34 may each have securing features 28/38 and 29/39. In this nonlimiting example, the securing features 28/38 of the upper component 22/32 includes a flange 28'/38' and the securing features 29/39 of the lower component 24/34 may include a plurality of projections 29'/39'. The plurality of projections 29'/39', in one embodiment, are located along two lines on the lower component 24/34 with enough space for the flange 28'/38' of the upper component 22/32 to fit in between the two lines of the plurality of projections 29'/39'. The plurality of projections 29'/39' may have a truncated cone shape but may take other forms. For example, the plurality of projections 29'/39' may also take the form of cylinders or hemispheres or any other shape able to create the same effect. In an example embodiment as shown in FIG. 2, the flange 28'/38' may be an angled flange 70 which is shorter next to the pivot joint in order to provide an even pressure across a width of the seat belt 50. The securing features 28/38 and 29/39 may be arranged in such a way that, when the fasteners 20/30 are closed, a seat belt 50 is able to contact yet fit over the first line of the plurality of projections 29'/39', contact yet fit under the flange 28'/38', and contact yet fit over the second plurality of projections 29'/39'. The securing features 28/38 and 29/39 therefore use frictional forces to stay in place on their location on the seat belt 50. In another alternative embodiment as shown in FIG. 17, the securing features 28/38 and 29/39 of the upper component 28/38 include two flanges with a plurality of protrusions on top of the flanges. The securing features 29/39 of the lower component 24/34 include three flanges positioned next to each other with a plurality of protrusions on top of the them. The securing features 28/38 and 29/39 are again arranged in such a way that, when the fasteners 20/30 are closed, a seatbelt 50 is able to contact and yet fit above the securing features 29/39 of the lower component 24/34 and contact yet fit below the securing features 28/38 of the upper component 22/32. In another alternative embodiment similar to FIG. 17, the locking features can include both a snap closure and a hook and eye closure such as, but not limited to, Velcro.

Connecting Member 40

Again, as stated above, a seat belt accessory 10 may include a connecting member 40. In an example embodiment the connecting member 40 may be of any shape and may be constructed out of any suitable material. In one embodiment, the connecting member 40 is constructed of a resilient material, for example, a bendable plastic material, of the type that will return, at least substantially, to its original shape after bending. Suitable materials may include, but are not limited to, polyethylene, poly propylene, or nylon. In one nonlimiting example embodiment, the thickness of the connecting member 40 may be reduced at the point of contact with the fasteners 20/30 so as to promote better bending properties.

In Use

When in use, a seat belt accessory 10 may be placed on a seat belt 50 to create more space between the seat belt 50 and a passenger. In a preferred embodiment, the seat belt accessory 10 may be used in vehicles but should not be limited to use in vehicles. The first and second fasteners 20/30 of the seat belt accessory 10 may be fastened onto the seat belt 50 and locked in place by the locking features 26/36 of the first and second fasteners 20/30. The securing features 28/38 and 29/39 apply frictional forces to stay in place on the seat belt 50. However, the frictional forces are not so great as to prevent adjusting of the placement of the fasteners 20/30 should the passenger choose. When the fasteners 20/30 are moved away from each other along the length of the seat belt 50, the connecting member 40 straightens in alignment with the seat belt 50. When the fasteners 20/30 are adjusted to be close together along the length of the seat belt 50, the connecting member 40 bends against the passenger and creates space between the passenger and the seat belt 50. If a significant force is applied to the connecting member 40 while it is bent, such as during an abrupt stop, the connecting member 40 is able deform so the seat belt 50 can continue to prevent bodily injury.

Figure 18:
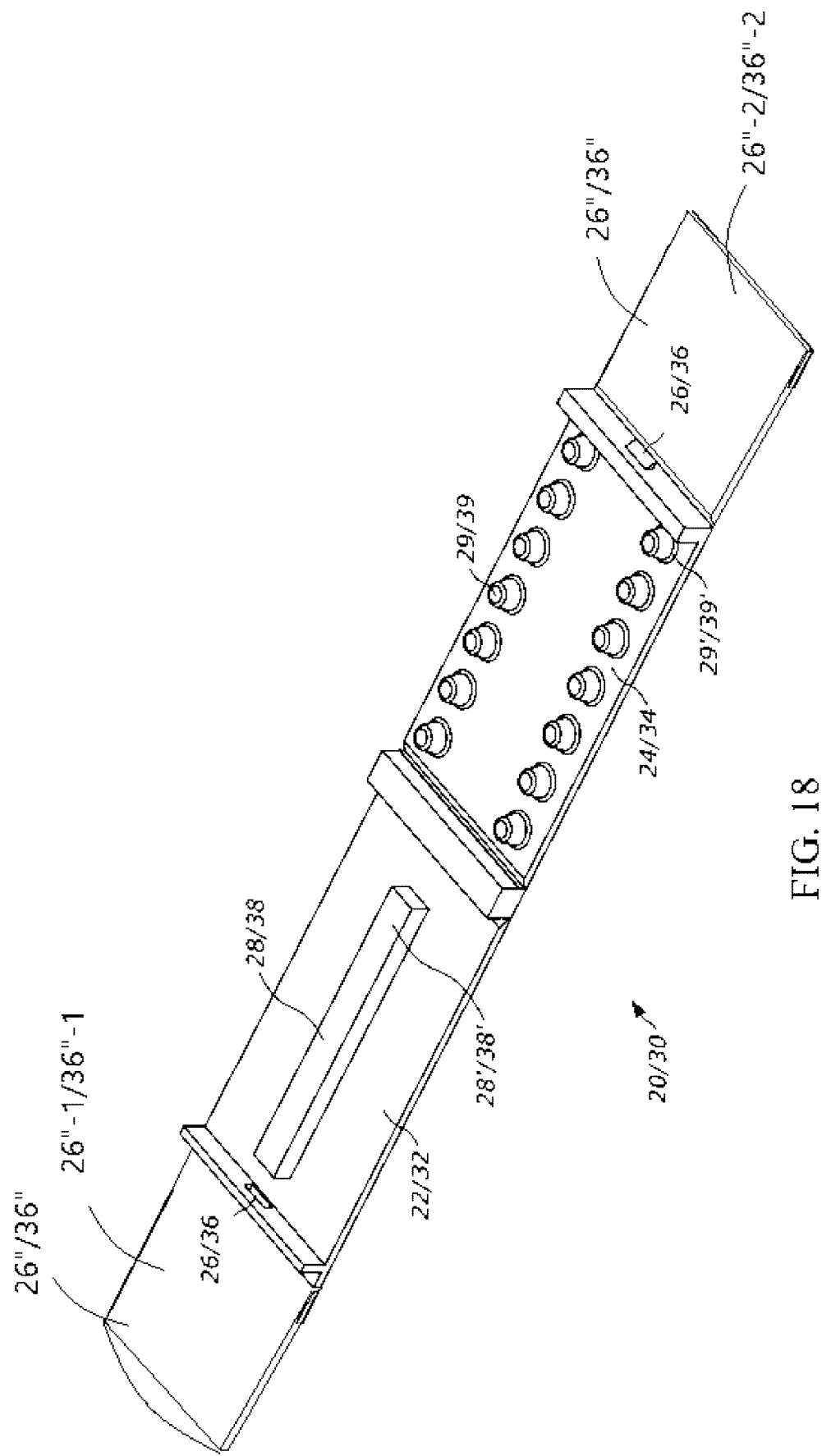
FIG. 18 is a perspective view of an example of a first and second fastener showing the locking features of the first and second fasteners, the securing features of the upper and lower components, and a pivot joint to connect the upper and lower component; wherein the securing features are a plurality of projections on the lower component and a flange on the upper component.

In some of the previous examples, the fasteners 20/30 are closed and locked via lock the locking features 26/36. In some embodiments, the locking features 26/36 are snap type locking features or hook type locking features. The inventor has found, under certain circumstances, the locking features 26/36 may decouple when in use. In order to prevent the locking features 26/36 from decoupling, the inventor created secondary locking features 26"/36" to prevent the locking features 26/36 from decoupling. The secondary locking features 26"/36" may, in one embodiment, take the form of closure and a hook and eye closure such as, but not limited to, Velcro and or 3M command strip, where the hooks lie on one surface 26"-1/36"-1 of the secondary locking features 26"/36" and the eye closure lies on a second surface 26"-2/36"-2 of the secondary locking features 26"/36". As one skilled in the art would readily understand, in the embodiment of FIG. 17, when the first and second fasteners 20/30 are closed, the surfaces 26"-1/36"-1 overlie the surfaces 26"-2/36"-2 thus enabling the secondary locking features 26"/36" to lock. The secondary locking features 26"/36" may be incorporated into any of the aforementioned embodiments. For example, FIG. 18 illustrates the embodiment of FIG. 13 modified to include the secondary locking features 26"/36".

What is claimed:

1. A seat belt accessory comprising:

a first fastener;

the first fastener having an upper component, a lower component, and locking features;

the upper component and lower component of the first fastener each having securing features;

a second fastener;

the second fastener having an upper component, a lower component, and locking features;

the upper component and lower component of the second fastener each having securing features;

a connecting member;

the connecting member extending a length between the first fastener and the second fastener;

wherein the upper component of each of the first fastener and second fastener is configured to engage the lower component of each of the first fastener and second fastener by way of the locking features;

wherein the connecting member is configured to bend and create space between a seat belt and a passenger as the first and second fasteners are placed closer together along a length of the seat belt.

2. A seat belt accessory comprising:

a first fastener;

the first fastener having, an upper component, a lower component, and locking features;

the upper component and lower component of the first fastener each having seeming features;

a second fastener;

the second fastener having an upper component, a lower component, and locking features;

the upper component and lower component of the second fastener each having securing features;

a connecting member;

the connecting member extending a length between the first fastener and the second fastener;

wherein the upper component of each of the first fastener and second fastener is configured to engage, the lower component of each of the first fastener and second fastener by way of the locking features;

wherein the connecting member extends as the first and second fasteners are placed further apart along the length of a seat belt.

3. The seat belt accessory of claim 1, wherein, when a pressure is applied to the connecting member, the first fastener and second fastener are configured to slide further apart and the connecting member is configured to instantly extend.

4. The seat belt accessory of claim 1, wherein the securing features of each of the lower components are a plurality of projections aligned in two rows and the securing features of each of the upper components are a flange configured to fit in between the plurality of projections.

5. The seat belt accessory of claim 1, wherein the securing features of each of the upper components are a plurality of projections aligned in two rows and the securing features of each of the lower components are a flange configured to fit in between the plurality of projections.

6. The seat belt accessory of claim 1, wherein the locking features of the first and second fasteners are a pivot latch.

7. A vehicle equipped with a seat belt accessory comprising:
   a vehicle;
   a seat belt;
   a seat belt accessory placed along a length of the seat belt;
   the seat belt accessory having a first fastener, a second fastener, a connecting member, and locking features;
   the first fastener having, an upper component, a lower component, and locking features;
   the upper component and lower component of the first fastener each having securing features;
   the second fastener having an upper component, a lower component, and locking, features;
   the upper component and lower component of the second fastener each having securing features;
   the connecting member extending a length between the first fastener and the second fastener;
   wherein the upper component of each of the first fastener and second fastener is configured to engage the lower component of each of the first fastener and second fastener by way of the locking features;
   wherein the connecting member is configured to bend and create a space between the seat belt and a passenger as the first and second fasteners are placed closer together along the length of the seat belt.

8. A vehicle equipped with a seat belt accessory comprising:
   A vehicle;
   A seat belt;
   A seat belt accessory placed along a length of the seat belt;
   the seat belt accessory having a first fastener a second fastener, a connecting member, and locking features;
   the first fastener having an upper component, a lower component, and locking features;
   the upper component and lower component of the first fastener each having securing features;
   the second fastener having an upper component, a lower component, and locking features;
   the upper component and lower component of the second fastener each having securing features;
   the connecting member extending a length between the first fastener and the second fastener;
   wherein the upper component of each of the first fastener and second fastener is configured to engage the lower component of each of the first fastener and second fastener by way of the locking features;
   wherein the connecting member extends as the first and second fasteners are placed further apart along the length of the seat belt.

9. The seat belt accessory of claim 7, wherein, when a pressure is applied to the connecting member, the first fastener and second fastener are configured to slide further part and the connecting member is configured to instantly extend.

10. The seat belt accessory of claim 7, wherein the securing features of each of the lower components are a plurality of projections aligned in two rows and the securing features of each of the upper components are a flange configured to fit in between the plurality of projections.

11. The seat belt accessory of claim 7, wherein the securing features of each of the upper components are a plurality of projections aligned in two rows and the securing features of each of the lower components are a flange configured to fit in between the plurality of projections.

12. The seat belt accessory of claim 7, wherein the securing features are a pivot latch.

13. A method for creating more seat belt space comprising:
   placing a seat belt accessory along a length of a seat belt;
   the seat belt accessory having a first fastener, a second fastener, a connecting member, and locking features;
   the first fastener having an upper component, a lower component, and locking features;
   the upper component and lower component of the first fastener each having securing features;
   the second fastener having an upper component, a lower component, and locking features;
   the upper component and lower component of the second fastener each having securing features;
   the connecting member extending a length between the first fastener and the second fastener;
   wherein the upper component of each of the first fastener and second fastener is configured to engage the lower component of each of the first fastener and second fastener by way of the locking features;
   wherein the connecting member is configured to bend and create a space between the seat belt and a passenger as the first and second fasteners are placed closer together along the length of the seat belt;
   placing the seat belt accessory against a body of a passenger;
   fastening the seat belt;
   adjusting the first fastener and second fastener along the length of the seat belt to create space.

14. The method for creating more seat belt space of claim 13, wherein the securing features are a plurality of projections.

15. The method for creating more seat belt space of claim 13, wherein the securing features are a flange.

16. The method for creating more seat belt space of claim 13, wherein the securing features are a pivot latch.

* * * * *